(12) United States Patent
Nakada et al.

(10) Patent No.: US 7,212,251 B2
(45) Date of Patent: May 1, 2007

(54) BROADCASTING SYSTEM OF DATA BROADCAST IN TELEVISION BROADCASTING

(75) Inventors: Kentaro Nakada, Tokyo (JP);
Masanao Kobayashi, Tokyo (JP);
Akira Tomomitsu, Tokyo (JP)

(73) Assignee: NHK Service Center, Inc., Tokyo (JP)

( * ) Notice: Subject to any disclaimer, the term of this patent is extended or adjusted under 35 U.S.C. 154(b) by 166 days.

(21) Appl. No.: 09/729,989

(22) Filed: Dec. 6, 2000

(65) Prior Publication Data

US 2001/0005236 A1 Jun. 28, 2001

(30) Foreign Application Priority Data

Dec. 27, 1999 (JP) ................................. 11-371520

(51) Int. Cl.
*H04N 5/38* (2006.01)
(52) U.S. Cl. .................................................... 348/723
(58) Field of Classification Search ................ 348/738, 348/460, 474, 462, 553–555, 632, 480–485, 348/461, 465, 467, 473–4; 725/40, 41, 136
See application file for complete search history.

(56) References Cited

U.S. PATENT DOCUMENTS

| | | | | |
|---|---|---|---|---|
| 4,139,866 A * | 2/1979 | Wegner | ....................... | 348/738 |
| 5,038,402 A * | 8/1991 | Robbins | ...................... | 725/144 |
| 5,325,127 A * | 6/1994 | Dinsel | ......................... | 348/473 |
| 5,438,372 A * | 8/1995 | Tsumori et al. | .............. | 348/365 |
| 5,603,077 A * | 2/1997 | Muckle et al. | .............. | 455/3.02 |
| 5,661,517 A * | 8/1997 | Budow et al. | ................. | 725/60 |
| 5,734,589 A * | 3/1998 | Kostreski et al. | ........... | 715/716 |
| 5,737,026 A * | 4/1998 | Lu et al. | ...................... | 348/473 |
| 5,844,552 A * | 12/1998 | Gaughan et al. | .............. | 725/37 |
| 5,999,216 A * | 12/1999 | Kaars | .......................... | 348/385 |
| 6,026,435 A * | 2/2000 | Enomoto et al. | ........... | 709/217 |
| 6,064,378 A * | 5/2000 | Chaney et al. | ................. | 725/39 |
| 6,076,094 A * | 6/2000 | Cohen et al. | ............. | 707/104.1 |
| 6,111,613 A * | 8/2000 | Sasano et al. | .............. | 348/468 |
| 6,275,989 B1* | 8/2001 | Broadwin et al. | ............ | 725/37 |
| 6,452,644 B1* | 9/2002 | Shimakawa et al. | ........ | 348/730 |
| 6,510,555 B1* | 1/2003 | Tsurumoto | .................... | 725/92 |
| 6,532,591 B1* | 3/2003 | Arai et al. | .................. | 725/132 |
| 6,549,241 B2* | 4/2003 | Hiroi | .......................... | 348/460 |
| 6,598,227 B1* | 7/2003 | Berry et al. | .................. | 725/77 |
| 6,675,388 B1* | 1/2004 | Beckmann et al. | ......... | 725/136 |
| 2004/0219977 A1* | 11/2004 | Ebisawa | ....................... | 463/31 |

* cited by examiner

*Primary Examiner*—Paulos M. Natnael
(74) *Attorney, Agent, or Firm*—Duane Morris LLP

(57) ABSTRACT

To present a broadcasting system of data broadcast capable of changing the screen display in a receiver, by displaying selectively the broadcast contents of plural channels on a receiving screen of digital satellite broadcasting of one channel, and selecting desired broadcast contents from plural on-air channels by viewer's local command operation. It is realized by broadcasting a reception screen 1 and a program Pr for controlling the sound suited to this screen 1 to a receiver Tv by using data broadcasting band in television broadcasting, and also broadcasting images of one channel of program and broadcast contents of plural programs used in data broadcast in the sound broadcasting band usually in combination to the receiver Tv, and, at the receiver Tv, selecting one desired program from the combined image and sound mixed signals of plural programs by the program Pr already received, and displaying on the screen 1 of the receiver Tv and delivering the sound of this screen.

5 Claims, 3 Drawing Sheets

BROADCASTING SYSTEM OF DATA BROADCAST IN TELEVISION BROADCASTING

BACKGROUND OF THE INVENTION

1. Field of the Invention

The present invention relates to a broadcasting system of data broadcast transmitted together in, for example, digital television broadcasting.

2. Description of the Related Art

Conventionally, the television broadcasting using broadcasting satellite in Japan was analog signal broadcasting (BS broadcasting), but BS satellite broadcasting using digital signals will start in near future, and it is planned to execute data broadcast together with digital satellite broadcast.

The data broadcast is executed in a form of attaching a data broadcasting band to ordinary broadcasting band, and when a combined form of ordinary broadcasting band and data broadcasting band is possible, a new form of broadcasting not realized in the conventional ground waves or analog wave satellite broadcasting will be possible.

In the invention, considering that the data broadcast is attached to the digital satellite broadcasting, it is an object to present a broadcasting system of data broadcast capable of changing the screen display in a receiver, by displaying selectively broadcast contents of plural channels on a receiving screen of digital satellite broadcasting of one channel, and selecting desired broadcast contents from plural on-air channels by viewer's local command operation.

SUMMARY OF THE INVENTION

The constitution of the broadcasting system of the invention developed to achieve the above object is characterized by broadcasting a reception screen and a program for controlling the sound suited to this screen to a receiver by using data broadcasting band in television broadcasting, and also broadcasting images of one channel of program and broadcast contents of plural programs used in data broadcast in the sound broadcasting band usually in combination to the receiver, and, at the receiver, selecting one desired program from the combined image and sound mixed signals of plural programs by the program already received, and displaying on the screen of the receiver and delivering the sound of this screen.

DESCRIPTION OF THE PREFERRED EMBODIMENTS

Figure 1:
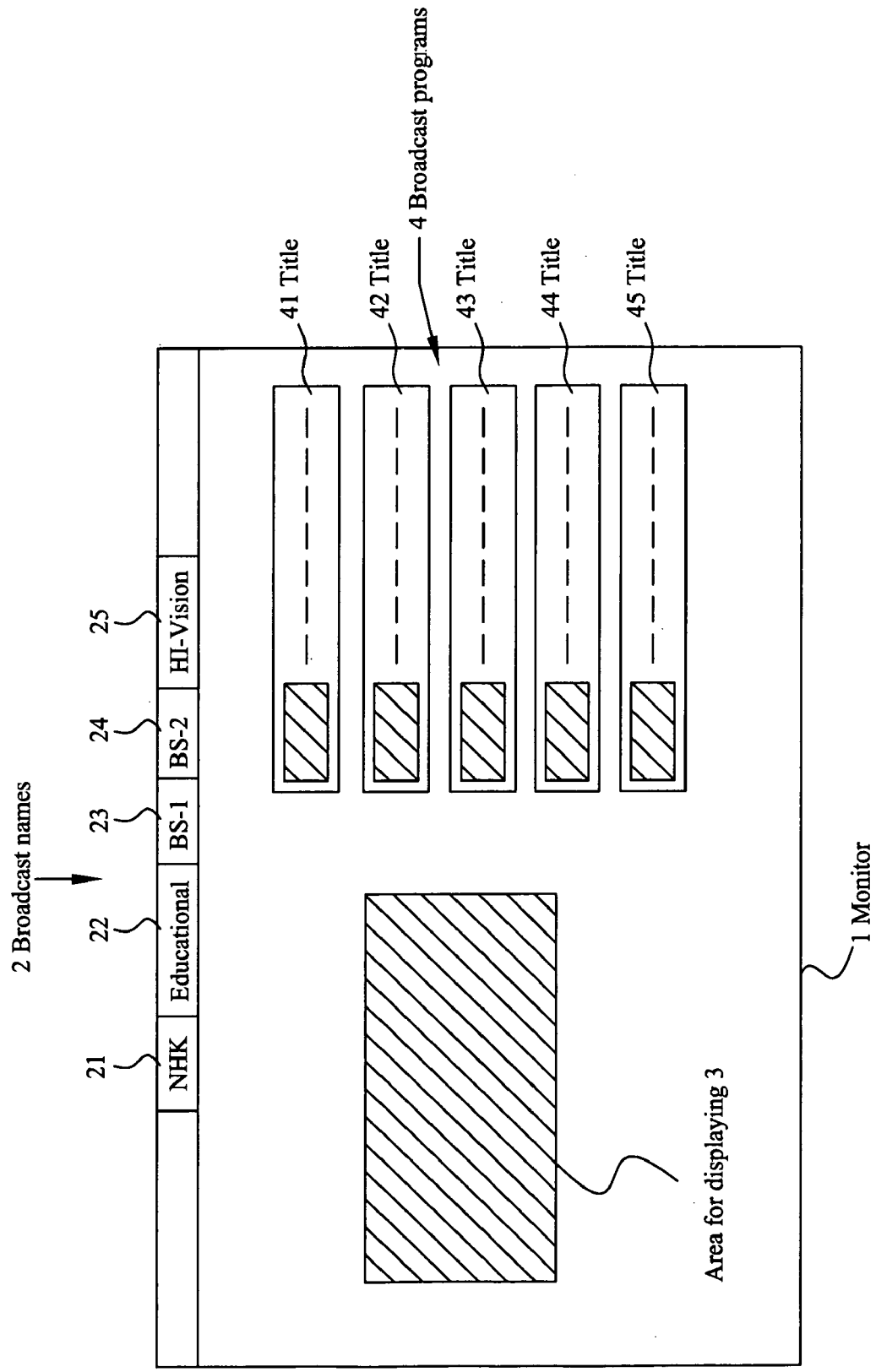
FIG. 1 is a front view schematically showing an example of a monitor screen in a receiver for receiving digital satellite broadcast accompanied by data broadcast by the system of the invention.

An embodiment of data broadcast by the system of the invention will be explained below while referring to the drawings. FIG. 1 is a front view schematically showing an example of a monitor screen in a receiver for receiving digital satellite broadcast accompanied by data broadcast according to the system of the invention, FIG. 2 is a block diagram showing an example of data broadcast and digital broadcast according to the system of the invention, and FIG. 3 is a block diagram of a conventional television broadcast receiver.

In the data broadcast system of the invention, the following scheme is employed in order to broadcast image and sound of plural programs by incorporating into data broadcast in one channel within the standard of digital satellite broadcasting system in Japan. It is explained below while referring to FIGS. 1 2.

Figure 2:
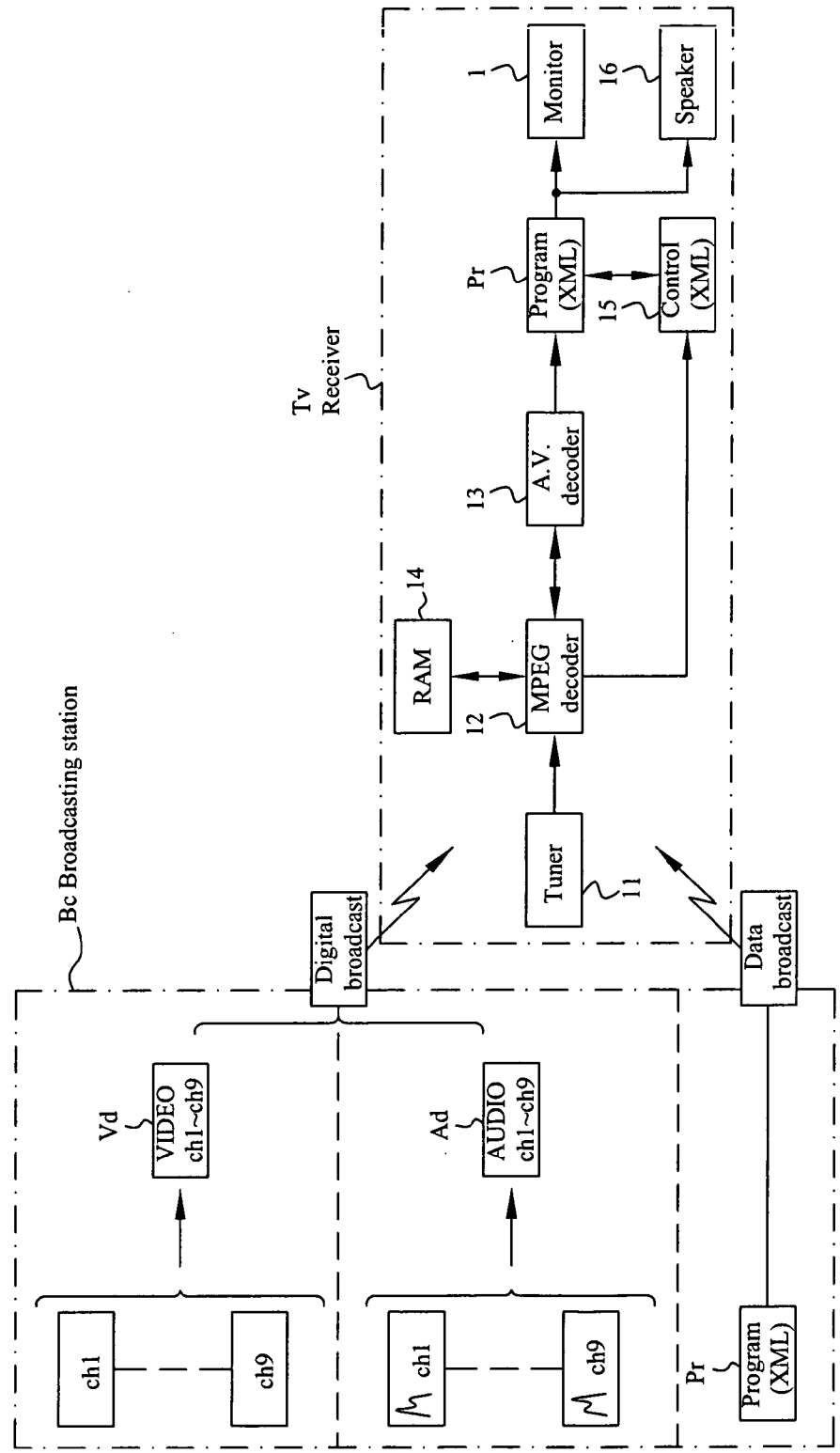
FIG. 2 is a block diagram showing an example of data broadcast and digital broadcast by the system of the invention.
Figure 3:
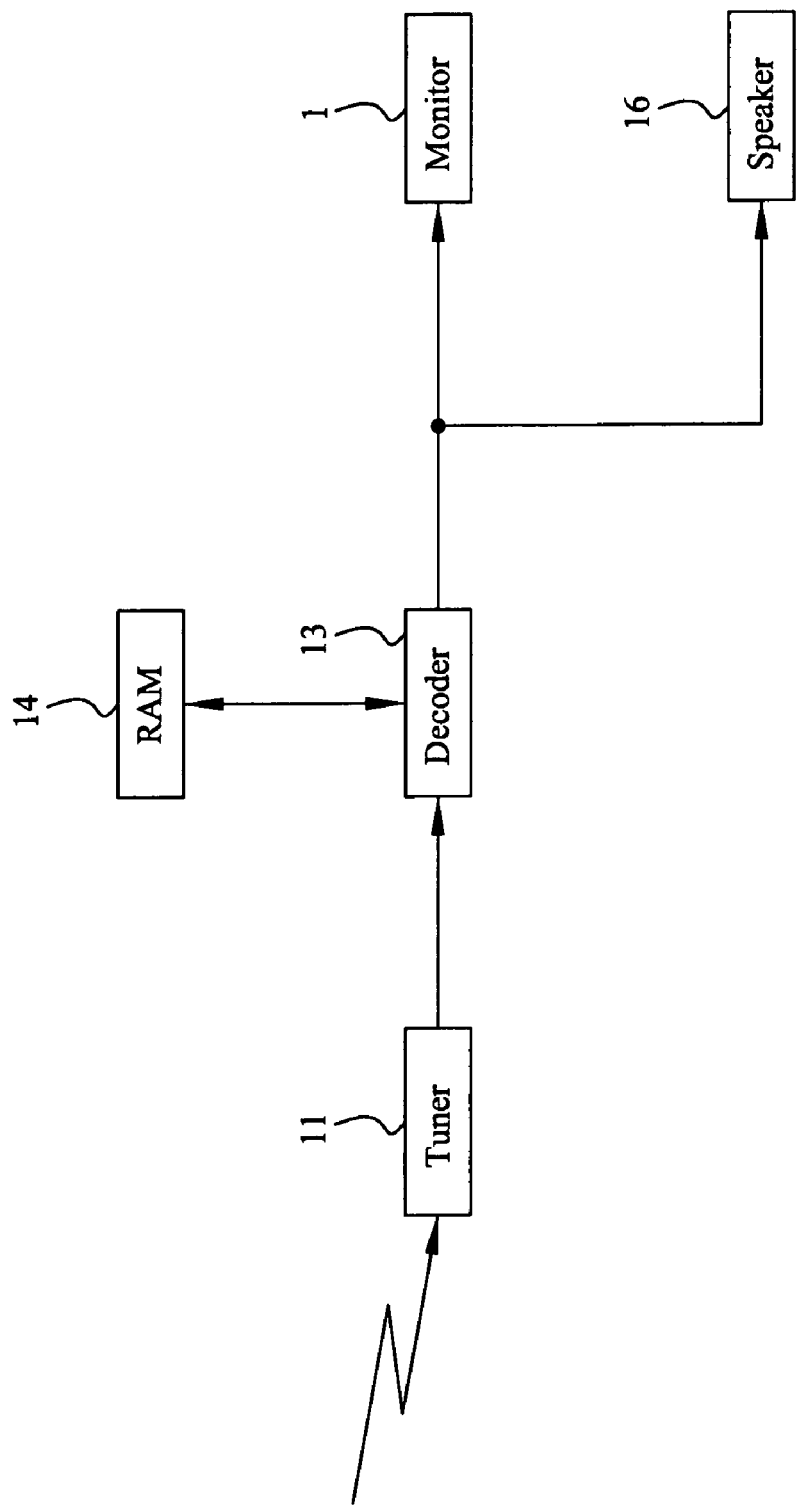
FIG. 3 is a block diagram of a conventional television broadcast receiver.

In FIG. 2, at a broadcasting station Bc side, in order to position images of plural programs on a monitor screen, one monitor screen in a program of one channel is divided into plural sections, or nine sections in the example in FIG. 2, and video data Vd incorporating broadcast images for nine channels into each divided screen is broadcast to a receiver Tv through broadcast satellite or the like. The audio data Ad of nine channels is also broadcast simultaneously with the video data, and this point is described later.

At the receiver Tv side, the data Vd and Ad are received by a tuner 11 as usual as data for one screen of one channel, and the received data compressed by MPEG (Moving Picture Experts Group) is decompressed by a decoder 12, and the video and audio data are decoded by a decoder 13, and the image processed by a program Pr for screen control already received in data broadcast is sent out to a monitor screen 1 of the receiver Tv. Reference numeral 14 is a RAM.

According to the invention, when sending out video data for nine channels, the writing point of electron beam and sending point of video data are controlled by operating the program Pr received in the data broadcast by a controller 15. More specifically, the writing position is provided with a time difference, and video data of plural channels are sent out by deviation, and therefore different images of plural programs can be written by selecting the position, at specified positions divided on the monitor screen of one channel.

On the other hand, audio signals are handled as follows. According to the satellite broadcasting standard in Japan, it is permitted to send out five audio signals in one channel. However, same as in the case of video signals discussed above, if attempted to send information of more than five programs together in one channel, all of audio data cannot be sent in this channel. That is, the audio signal band is insufficient. In the invention, accordingly, five audio signal bands available in one channel are individually divided into plural sections, and mixed audio signals Ad are sent in the divided bands, and at the receiver Tv side which receives them, by operating the program Pr already received by data broadcast by means of the controller 15, the mixed audio signals Ad are separated and reproduced from a speaker 16.

Herein, in mixing of audio signals of plural programs at the broadcasting station Bc, for example, the transfer rate of 48 kHz specified in the broadcasting standard in Japan is divided, and exchanged alternately in bit units by the number of divisions, thereby sending out as audio signals Ad apparently at 48 kHz. When reproducing the audio signal Ad received in the receiver Tv by the speaker 16, the program Pr is created so as to reproduce at audio transfer rate of, for example, 24 kHz in the case of two divisions, or 16 kHz in the case of three divisions, and it is operated by the controller 15 to reproduce in the speaker 16. Since the audio signals to be reproduced by the speaker 16 are combined in bit units, there is no possibility of occurrence of sound interruption.

FIG. 1 is an example of an image on the monitor screen 1 in the receiver Tv, in which broadcast names 2 are displayed parallel in the horizontal direction in the upper part of the monitor screen 1, and herein five names are displayed: "NHK" 21, "Educational" 22, "BS-1" 23, "BS-2" 24, and "Hi-Vision" 25.

In the screen display, for example, when "NHK" 21 is selected from the broadcast names 2, the left half of the monitor screen 1 becomes an area 3 for displaying the image of the broadcast contents, and the right half of the screen 1 shows a plurality of, herein, five titles 41 to 45 of broadcast programs 4 of this NHK 21 broadcast in five stripes in the vertical direction.

Therefore, when the viewer selects an arbitrary one of the titles 41 to 45 of programs 4 displayed on the monitor screen 1 by a local remote control switch (not shown) for manipulating the television set which is the receiver Tv capable of receiving data broadcast by the system of the invention, ordinary television broadcast, and digital satellite broadcast, the image of the program corresponding to the selected one of the titles 41 to 45 is displayed in the display area 3.

By manipulating the local remote control switch, when an arbitrary one of broadcast names 21 to 24 in broadcast names 2 is selected sequentially, the titles 41 to 45 of the programs4 in any one of the broadcast names 21 to 24, and the contents of display area are changed, and in the changed state, when any one of the titles 41 to 45 is selected, the image corresponding to the selected one of the titles 41 to 45 is displayed in the display area 3.

As described herein, by the broadcasting system of the invention, by using the ordinary broadcasting band in television broadcast such as digital satellite broadcast, and the accompanying data broadcasting band, contents and titles of plural broadcast programs can be selectively displayed on the monitor screen of one channel, and therefore contents and titles of plural broadcast programs can be searched by the operation of the viewer side on the television screen, and therefore without resort to the guide book of television programs or television program columns of the newspaper, the broadcast contents and on-air time for selection of broadcast and selection of program, and the information about television broadcast such as broadcast names can be always displayed on the television screen and checked, and the combined broadcast form of digital broadcast and accompanying data broadcast not realized in the conventional ground wave broadcast or satellite broadcast can be realized. The data broadcasting system of the invention is also applicable to the existing analog broadcast.

What is claimed is:

1. A method of television broadcasting comprising the steps of:
    providing plural entertainment programs for broadcast to a receiver, each entertainment program having image signals and sound signals;
    mixing the sound signals of the plural entertainment programs using a computer executable code;
    broadcasting the image signals and mixed sound signals for the plurality of entertainment programs on one channel of a first broadcasting band to the receiver;
    broadcasting the computer executable program in a second broadcasting band which is different from the first broadcasting band to the receiver;
    selecting one of the plurality of entertainment programs for display at the receiver;
    using the computer executable program to provide the sound corresponding to the selected one of the plural entertainment programs.

2. The method of claim 1 wherein the computer executable program is broadcast in advance of the image and mixed sound signals.

3. The method of claim 1 wherein the broadcasted image and mixed sound signals are digital signals.

4. The method of claim 1 wherein the broadcasted image and mixed sound signals are encoded in MPEG format.

5. The method of claim 1 wherein the first broadcast band is the streaming band and the second broadcast band is the data broadcast band.

* * * * *